P. J. QUARTANA.
FENDER ATTACHMENT FOR AUTOMOBILES.
APPLICATION FILED AUG. 24, 1921.
1,397,903.
Patented Nov. 22, 1921.
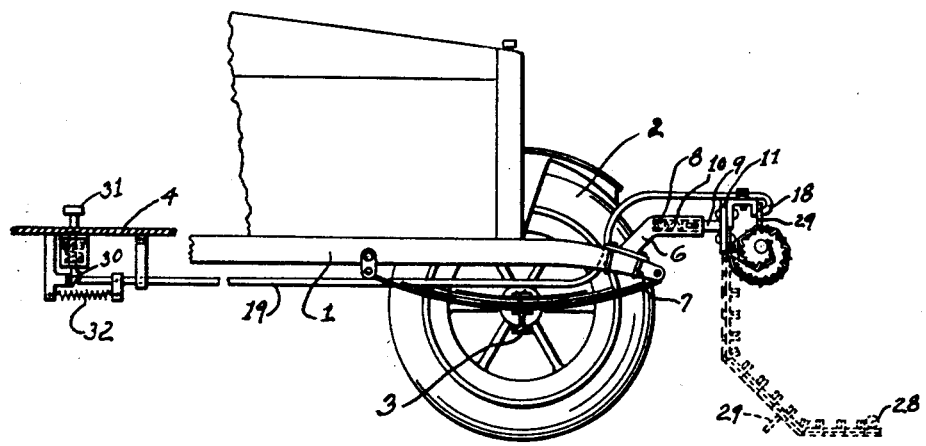

UNITED STATES PATENT OFFICE.

PETER J. QUARTANA, OF MILWAUKEE, WISCONSIN.

FENDER ATTACHMENT FOR AUTOMOBILES.

1,397,903.  Specification of Letters Patent.  Patented Nov. 22, 1921.

Application filed August 24, 1921. Serial No. 494,926.

*To all whom it may concern:*

Be it known that I, PETER J. QUARTANA, a citizen of the United States, residing at Milwaukee, county of Milwaukee, and State of Wisconsin, have invented new and useful Improvements in Fender Attachments for Automobiles, of which the following is a specification.

This invention relates to improvements in fender attachments for automobiles.

It is an object of this invention to provide a safety fender adapted to be mounted inconspicuously upon an automobile and to extend itself automatically to operative position when a catch is released by the operator. In devices of this sort heretofore described, the attachments have either been so cumbersome as to disfigure the vehicle to which they are attached, or have been so constructed as to require the use of highly complicated extensible braces for supporting the fender when it is in operative position. The device, hereinafter to be described, overcomes the above noted objections and is extremely simple in its constructions.

It is a further object of this invention to provide an improved means for supporting the net or canvas body of the fender in operative position without the use of braces or actuating members.

Other objects of this invention are to produce a fender attachment which can be easily and cheaply constructed: which will be simple and practically automatic in its operation: and which is so designed as to be attached readily to cars now in use.

In the drawings:—

Figure 1 is a side elevation of an improved safety fender embodying this invention, the fender being shown in the position in which it is carried when not in use and the operative position being indicated by dotted lines.

Fig. 2 is a front elevation of the same fender applied to a motor vehicle and in operative position thereon.

Fig. 3 is a detail view of the hinged frame whereby the fender is supported in its operative position.

Figs. 4, 5 and 6 are detail views of the members of which the hinged frame is composed.

Like parts are identified by the same reference characters throughout the several views.

The parts of the automobile, shown herein, include the frame bar 1, wheel 2, axle 3 and floor board 4. The safety fender embodying this invention is attached to the frame members 1 by means of special brackets 6, secured in place by U-bolts 7. Recesses 8 in the brackets are adapted to receive plungers 9, pressed outwardly by springs 10, to provide a resilient mounting for the plate 11 which is carried by plungers 9 and which serves to support the fender proper.

The fender comprises a special frame 15 made up of a great number of small units 16 hinged together to permit the frame to be rolled up, a canvas or netting body portion 17 adapted to be supported in operative position by the distended frame and a latch 18 operable from the driver's seat for releasing the frame and allowing it to be drawn by gravity to its operative position.

The flexible frame, designated in its entirety by the numeral 15, is made up, as above stated, of a large number of hinged links 16, one of which appears in plan in Fig. 6. These links are all alike and are so designed as to be readily formed and quickly assembled. Each link 16 includes a flat base portion 20 slotted at 21 with upturned end portions 22 and 23. The upturned portion 22 is of less width than the body 20 of the link and comprises a tongue adapted to be received into the slot 21 in the base of the next succeeding link. It will be noted that the majority of the struck-up end portions 22 and 23 of the links 16 are bent at right angles to the base portions 20 of the links. As shown in Fig. 3, however, certain of these portions are bent to form an acute angle with their respective base plates for purposes hereinafter to be specified.

The base plate 20 of each link is provided with a central hole 24 of small diameter which is adapted to receive one of the rivets 25. Associated with each of the link members 16 is a complementary plate 26 secured thereto by the rivets 25. The function of these plates is to prevent the separation of the links after they have been assembled.

In assembling the side members of frame 15, the links 16 are readily joined together by simply inserting the upturned tongue portion 22 at the end of one link into the slot 21 formed in the base 20 and the upturned end 23 of the next link in the series.

A number of links being so joined together, they are laid upon the edge of the fabric 17 and a rivet 25 is inserted through the bottom of each link to engage the fabric 17 between the link and the complementary plate 26. The rivets are then headed to prevent the separation of the parts. It will be understood, of course, that screws or small bolts may be used in place of the rivets, but the construction as illustrated is consistently cheap, effective and easily assembled.

The upper link 16 of each of the side members of frame 15 is secured to the plate 11 supported from the vehicle frame. The canvas or net 17, secured at its ends between the links and the complementary members which make up the sides of frame 15, is fastened along its upper margin to the same plate 11. The lower margin of the fabric is fastened to a transverse bar 28 which connects the extreme lower ends of the hinged side members of frame 15. This bar may, if desired, be provided at its ends with small wheels adapted to support the safety fender from the ground when the fender is in the operative position shown in dotted lines in Fig. 1. Ordinarily, however, this will not be necessary since the fender is made sufficiently strong by the irreversible hinges between the units 16 to support itself out of contact with the ground.

It will be noted by referring to Fig. 1 that the units 16 which have their end portions 23 bent to acute angles are so disposed as to provide bends in the hinged side members of frame 15. The purpose for which these bends are provided is to enable the fabric backing 17 of the fender to be carried forwardly, as shown in Fig. 1, to a suitable operative position without unnecessarily sharp bends which would tend to form a pocket which might injure a person caught by the fender.

At the back of the frame member is a projecting flange 29 which, when the frame is rolled up in the manner shown in Fig. 1, is adapted to be engaged by the latch 18. This latch is operable by a rod 19 which may be projected forwardly by a wedge 30 actuated by a foot pedal 31 in an obvious manner. The spring 32 normally holds the rod 19 retracted with the latch 18 in its operative position of engagement with the flange 29.

The fender embodying this invention is adapted to be operated as follows: The interacting tongues 22 and slots 21 allow the base plates 20 of the several links 16 of each folding side member to be bent inwardly upon each other. The upwardly projecting portion 22 and the upwardly bent end 23, however, are adapted to contact when the base plates 20 of the links are in line to prevent a further backward bending motion between the links. It is, therefore, possible to construct a frame which will be absolutely rigid against a pressure tending to buckle the frame rearwardly while being sufficiently flexible to permit the rolling of the frame into the full line position of Fig. 1. When the frame is completely rolled, the latch 18 is manually engaged with the flange 29 to maintain the fender in its inoperative position.

In this position the fender is inconspicuous and does not detract from the appearance of the vehicle upon which it is mounted. When there is danger of striking a pedestrian, the operator of the vehicle can release the fender instantaneously by pressing the floor button 31 to force rod 19 forwardly and release catch 18. As soon as the catch is disengaged from the flange 29, the fender will immediately drop to the position in which it appears in Fig. 2 and in the dotted lines of Fig. 1. The bar 28 not only spaces the flexible side frame members 15, but serves, by its weight, to secure the immediate dropping of the fender when the floor button 31 is actuated.

It will be noted that the construction of the fender is such that it cannot form a deep pocket into which the pedestrian might be forced, striking his head upon some of the outstanding portions of the device. The lower portion of the fender is sufficiently extended to form a resting place for a person struck by the vehicle so that his body will be supported and will not be dragged upon the ground.

I claim:

1. A safety fender attachment including a flexible frame member formed of a plurality of units adapted to be loosely interconnected for one way hinge movement, a sheet of fabric supported from said frame member, and means for binding said fabric to each of said units, said binding means being also adapted to secure said units together.

2. A safety fender for vehicles including a frame provided with hinged joints at frequent intervals along its side members, said joints being adapted to permit the flexion of the frame in one direction from its operative position, and a sheet of material carried by said frame and adapted to be rolled up when the frame is flexed at said joints.

3. A safety fender attachment for vehicles including a frame, a fabric covering therefor, means for rendering said frame flexible in one direction from its operative position and rigid against a pressure tending to move it in the opposite direction whereby said frame and covering can be formed into a roll, and means releasable from the seat of the driver of the vehicle for retaining said frame and covering in a normal rolled position.

4. In a safety fender device for vehicles, a frame member comprising a plurality of links having upturned ends and slots adjacent one of said ends, and means for retaining said links in operative connection after they have been interlocked.

5. In a safety fender attachment for vehicles, a side frame member comprising a plurality of links provided with slots, bent-up end portions including a portion of the slats, bent-up portions at the other end of said links adapted to be received into said slots, and means for preventing the disengagement of links interlocked by the insertion of said last named end portions into the slot adjacent said first named end portion.

6. In a safety fender attachment for vehicles, the combination with one link, of a plurality of similarly formed links, means for securing said links in interlocked relationship, and means for rendering said links rigid against flexion from their operative position in one direction while permitting free flexion to and from their operative position in the other direction.

7. In a safety fender attachment for vehicles, the combination with one link, of a plurality of similar links disposed in a series, each link having a base portion and turned-up ends, one end being reduced and the other provided with a slot adjacent its base and the reduced portion of one link being adapted for insertion through the slot in the next link in the series for interaction with the upturned end of said next link.

8. In a safety fender device, a frame member comprising a plurality of links having upturned ends and slots adjacent one of said ends, whereby said links may be interlocked, a sheet of fabric, and means for securing the fabric to the links and retaining said links in operative interconnection.

PETER J. QUARTANA.